United States Patent [19]

Maddock

[11] Patent Number: 4,697,952
[45] Date of Patent: Oct. 6, 1987

[54] UNDERGROUND IRRIGATION APPARATUS AND METHOD FOR USING SAME

[76] Inventor: Mitchell E. Maddock, 541 West Coolidge Ave., Coolidge, Ariz. 85228

[21] Appl. No.: 834,544

[22] Filed: Feb. 28, 1986

[51] Int. Cl.<sup>4</sup> ............................................. E02B 13/00
[52] U.S. Cl. ......................................... 405/43; 405/36
[58] Field of Search ................ 405/36, 43, 269, 39–41

[56] References Cited

U.S. PATENT DOCUMENTS

| | | | |
|---|---|---|---|
| 2,960,831 | 11/1960 | Lonaberger et al. | 405/269 X |
| 3,422,626 | 1/1969 | Hanrahan | 405/43 |
| 3,427,810 | 2/1969 | Petersen | 405/43 |
| 3,902,323 | 9/1975 | Watanabe | 405/43 |
| 4,260,284 | 4/1981 | Huart | 405/43 |

Primary Examiner—David H. Corbin
Attorney, Agent, or Firm—Richard R. Mybeck

[57] ABSTRACT

Underground irrigation apparatus (10) having a ground penetrating part (12) arranged for forming a hole (14) in ground (16) to be irrigated, and a separate distribution part (18) arranged for insertion into the hole (14) formed by the ground penetrating part (12) and dispensing a fluid into ground to be irrigated. Preferably, the ground penetrating part (12) is inserted into a socket (22) formed in the distribution part (18) when the latter is lowered into the hole (14) previously formed by the ground penetrating part (12) in order to prevent clogging of discharge ports of the distribution part (18) during the installation process.

16 Claims, 4 Drawing Figures

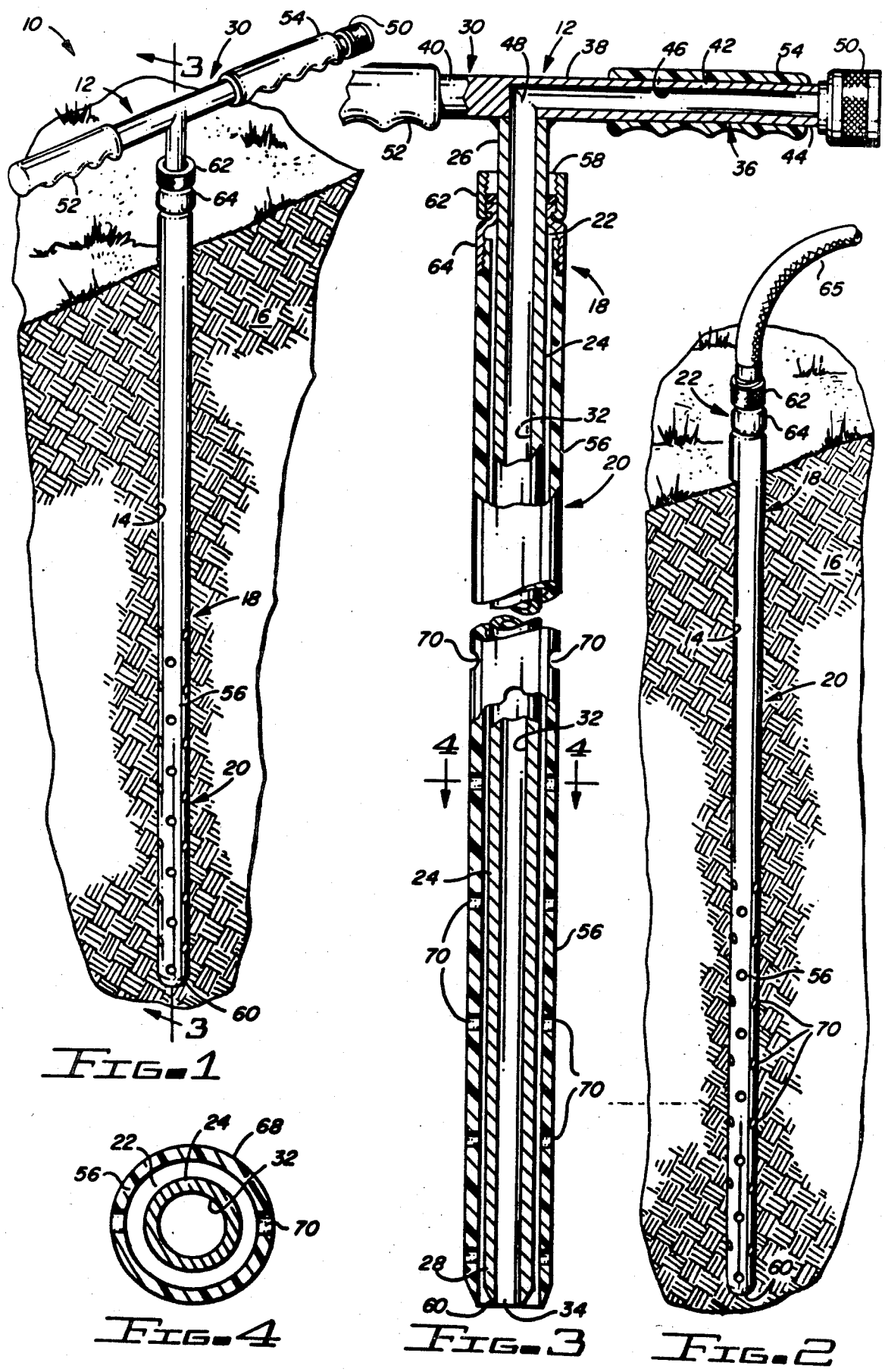

UNDERGROUND IRRIGATION APPARATUS AND METHOD FOR USING SAME

BACKGROUND OF THE INVENTION

1. Field of the Invention

This invention relates generally to apparatus for injecting water or other suitable fluid directly into soil to reach the roots of vegetation thereabout and more particularly to an underground irrigation apparatus which can be inserted into ground to be irrigated in a simple and efficient manner.

2. Description of the Prior Art

It has long been known to insert appropriate devices into soil in order to treat the ground as is appropriate for various crops. For example, U.S. Pat. No. 3,762,171, issued Oct. 2, 1973, to I. Byorheim, et al, discloses a ground heater which injects steam into soil being treated in order to thaw the soil. More commonly, however, such apparatus is employed for purposes of direct irrigation of plant roots, and the like, or for fertilizing crops, killing weeds, and the like.

For example, U.S. Pat. No. 749,758, issued Jan. 19, 1904, to W. G. Templeton, discloses an underground irrigation device including two pieces of pipe connected at right angles by a shutoff valve. One of the pipes is designed for connection to a hose, and the other for insertion into soil to be irrigated. The latter pipe is provided with a water outlet and ground cutting teeth at its lower end for facilitating insertion into the soil to be treated, and may be equipped with a nozzle if desired. A stream of water or other medium emerges only from the lower, or nozzle end of the ground insertable pipe so as to aid in penetration of the pipe as well as irrigating the soil. Further, U.S. Pat. Nos. 1,893,707, issued Jan. 10, 1933, and U.S. Pat. No. 1,964,064, issued June 26, 1934, both to G. C. Karshner, disclose an apparatus for underground fertilization of tree roots and the like, which are similar to the device discussed above in that a treating medium emerges only from a lower end of a longitudinally extending pipe, or tube, inserted into a soil to be treated. In U.S. Pat. No. 1,893,707, a hand-operated shutoff squeeze lever can be employed to control the flow of a liquid fertilizer into the soil being treated.

U.S. Pat. No. 2,850,992, which issued Sept. 9, 1958 to J. J. Hooper et al, discloses a garden watering tool which includes a plurality of prongs insertable into soil to be irrigated, but in which the irrigating medium flows out of a downwardly extending pointed tip of each prong in the same manner as in the devices discussed above. U.S. Pat. No. 3,326,306, issued June 20, 1967, to B. B. Weir, discloses a water spade, which, although primarily intended as a spade in which a fluid medium assists in digging, will inherently irrigate the soil in which the spade is being used.

U.S. Pat. No. 1,058,138, issued Apr. 8, 1913, to A. C. Balou, discloses a device primarily intended for preparing soil for transplanting purposes and in which an inner sleeve slidably disposed in an apertured outer sleeve causes a lateral flow of water when the device has been inserted into soil to be treated. A primary difference between this device and those discussed above is that the irrigating flow is lateral of the ground insertable pipe member as opposed to the axial flow obtained by the others. In a like manner, U.S. Pat. No. 3,900,962, issued Aug. 26, 1975 to S. F. Chan, discloses a fertilizing apparatus which is wind driven for metering air and collected rain directly into soil to be treated. Like the device discussed immediately above, the flow of fluid from the portion of the device inserted into soil being treated is lateral, as opposed to axial, of the inserted portion.

U.S. Pat. No. 2,875,713, issued Mar. 3, 1959, to W. M. Shoffner, discloses a root feeder combining both lateral and axial discharge from a ground insertable portion. This combined flow, however, is constant in both directions, instead of the more desirable primarily axial flow drain during insertion and primarily lateral flow after insertion.

U.S. Pat. Nos. 2,336,522, issued Dec. 14, 1943, to J. K. Aiman, and U.S. Pat. No. 3,659,536, Issued May 2, 1972, to R. B. White, overcome the principal drawback of the device discussed immediately above by controlling axial and lateral flow as desirable. To accomplish this end, the former device employs separate control valves disposed in a portion of the apparatus which remains above ground, while the latter device permits axial flow at all times, but has a sliding sleeve valve disposed in the ground penetrating portion thereof for blocking and unblocking the lateral apertures. A principal disadvantage of this construction is that the sliding parts can become clogged by dirt during the ground penetrating operation.

SUMMMARY OF THE INVENTION

It is an object of the present invention to provide underground irrigation apparatus which is simple and reliable of construction, and which will resist clogging, and the like, during installation and use in ground to be irrigated.

Another object of the present invention is to provide an underground irrigation apparatus which is installed by use of axial flow of an operating fluid, but which provides the more desirable lateral flow into the ground being treated once installation is complete.

It is yet another object of the present invention to provide an underground irrigation apparatus which can be installed in a simple and convenient manner using only manual labor and a suitable operating fluid, such as irrigation water, and without the need of special tools, and the like.

Yet another object of the present invention is to provide an underground irrigation apparatus which can be used in connection with conventional garden hoses, and the like, to effect desired underground irrigation.

These and still other objects of the present invention as shall hereinafter appear are fulfilled by the present invention in a remarkably unexpected fashion as will be readily discerned from the following detailed description of underground irrigation apparatus comprising a ground penetrating device arranged for forming a hole in ground to be irrigated, and a distribution assembly arranged for insertion into a hole formed by the ground penetrating means and dispensing a liquid into the ground in which the device is disposed. The distribution means advantageously includes a discharge arrangement and is provided with a socket arranged in communication with the discharge arrangement for selectively receiving the ground penetrating means and preventing blockage of the discharge arrangement during insertion of the distribution means into a hole formed by the ground penetrating means. Both the ground penetrating means and the distribution means are independently connectible to a source of an operating fluid which may be under pressure, such as water delivered by a conventional garden hose from a conventional hose bib and the like. The ground penetrating means has only an axial flow path therethrough to facilitate ground penetration, while the distribution means has lateral flow or discharge paths in addition to the axial path to facilitate distribution of irrigation water and like fluids throughout the soil being treated.

It is an advantage of the present invention that underground irrigation can be realized in a simple and efficient manner, without the need of special tools.

It is another advantage of the present invention that a lateral flow can be achieved in an underground irrigation device without risk of clogging of the lateral ports or apertures during installation of the apparatus.

Yet another advantage of the present invention is that a specified area can be irrigated underground as desired without the need of expensive equipment being previously in place in the area in question.

The foregoing and other objects of this invention, as well as the invention itself, may be more fully understood when read in conjunction with the accompanying drawings in which like parts bear like indicia throughout the several views.

BRIEF DESCRIPTION OF THE DRAWING

In the drawing:

FIG. 1 is an isometric view, partially broken away, and in section, showing one aspect of the underground irrigation apparatus embodying the present invention;

FIG. 2 is an isometric, partially broken away view, showing underground irrigation apparatus embodying the present invention in its ultimate use mode;

FIG. 3 is a cross-sectional view, along line 3-3 of FIG. 1; and

FIG. 4 is a cross-sectional view taken along line 4—4 of FIG. 3.

DESCRIPTION OF THE PREFERRED EMBODIMENTS

Referring now more particularly to FIGS. 1 and 2 of the drawing, underground irrigation apparatus 10 according to the present invention is illustrated as comprising ground penetrating means such as part 12 which is capable of forming in the manner to be described below a hole 14 in an area of ground 16 for which irrigation is desired. Distribution means such as part 18 when inserted into hole 14 formed by part 12 will dispense the desired liquid, such as water, into ground 16 as desired. Distribution means 18 includes a discharge arrangement 20 and a socket 22 arranged communicatively with discharge arrangement 20 and selectively receiving ground penetrating part 12 as illustrated in FIG. 1. The purpose of nesting part 12 into and within socket 22 of part 18 is to prevent blockage of the discharge arrangement 20 during insertion of distribution means 18 into hole 14. The procedure for installing apparatus 10 will be described in greater detail below.

Referring now more particularly to FIGS. 3 and 4 ground penetrating means 12 includes an elongated tubular body portion of element 24 having a pair of spaced ends 26 and 28, and a handle assembly 30 affixed to end 26 for facilitating insertion of end 28 into the ground to be irrigated. Elongated element 24 having a length herein denominated "an extent" is provided with a through passage or central passageway 32 extending from end 26 of element 24 to end 28 thereof and forming an egress opening 34 at the latter. The handle assembly 30 is provided with a flow system 36 arranged in communication with end 26 of element 24, with flow system 36 being provided in element 24 for furnishing a fluid under pressure to passage 32. The force of the fluid exiting from the egress opening 34 assists in insertion of the elongated element 24 into ground 16 to be irrigated.

The handle assembly 30 comprises a longitudinally extending member 38 having a longitudinal axis and forming a pair of similar, oppositely directed arms 40, 42 which terminate respectively in end portions, only one of which is shown and is designated by the reference numeral 44.

Member 38 is affixed symmetrically to tubular body portion elongated 24 and positioned so that the longitudinal axis of the member 38 is disposed substantially perpendicular to an extension of the longitudinal axis of body portion 24. Flow system 36 comprises a bore 46 centrally formed in arm 42 and terminating substantially midway of longitudinally extending element 38 at bend 48 which is arranged to establish communication between bore 46 and central passageway 32 defined in element 24. A suitable hose fitting 50 is secured to end portion 44 to provide communication between bore 46 and a suitable source of fluid under pressure, such as water from a conventional garden hose connected to a conventional hose bib and the like, (not shown).

Each of the arms 40, 42 are advantageously provided with conventional hand grips 52 and 54, respectively, which facilitate the installation of elongated element 24 in a manner to be hereinafter described.

Distribution means 18 includes a hollow body member or sleeve 56 having open ends 58 and 60, the latter of which is tapered to facilitate its insertion into the ground or like substrate. Sleeve 56 provides a manifold to distribute liquid to the preselected situs. A conventional hose coupling 62 including retaining collar 64 is attached to end 58 of hollow body member 56 to enable a convenient water source such as garden hose 65 to be attached thereto in the conventional manner. As shown in FIG. 4, sleeve 56 is substantially coextensive with and has a cross section defined by circumference 68 sufficient to receive elongated element 24 therewithin to prevent clogging of the plurality of perforations or foraminae 70 formed around the circumference 68 of sleeve 56 as desired to obtain therethrough an efficient lateral flow distribution from sleeve 56.

OPERATION

Referring to FIGS. 1 and 2, underground irrigation apparatus 10 embodying the present invention can be installed in a piece of ground 16 so as to form the requisite hole 14 by first taking the ground penetrating means 12 and, in a manner not shown in the drawing but believed to be readily understandable, driving the lead point of part 12 into ground 16 by gripping the handle grips 52, 54 and forcing part 12 downwardly which with the assistance of water passing down passageway 32 and through opening 34, causes hole 14 to be formed. As previously described, the water is sourced from a conventional garden hose or the like which is connected at one end to hose fitting 50 in a manner not shown but well known per se, and at the other end to a convenient hose bib (not shown). With the assistance of the water flowing from opening 34, penetrating means 12 can be driven downwardly into ground 16 generally without a great deal of effort. Once hole 14 has been formed in the manner indicated penetrating means 12 is then removed from ground 16 leaving an empty hole 14 into which distribution means 18 can be readily inserted. Although in many cases it is possible to merely insert distribution means 18 into the preformed hole 14 and thereafter connect hose coupling 62 to hose 65 in order to carry out irrigation operations, it is preferable that the ground penetrating means 12 be telescopically inserted into socket 22 and hollow body member 56 of distribution means 18 prior to inserting means 18 into hole 14 so that clogging of perforations 70 which might otherwise occur is literally precluded during the insertion process. Even during post installation periods, the removal of any accumulation of dirt and the like from within perforations 70 is readily achieved by disconnecting hose 65 and inserting and axially reciprocating means 12 within hollow sleeve 56 which allows element 24 to dislodge the dirt and debris from within perforations 70.

Once apparatus 10 comprising distribution means 18 and ground penetrating means 12 is disposed into hole 14, the apparatus 10 will appear as shown in FIG. 1. Subsequently, ground penetrating means 12 can be removed from within sleeve 56 through socket 22 while distribution means 18 remains disposed within hole 14. Thereafter, a conventional hose 65 or the like can be attached to hose coupling 62 and distribution means 18 is provided a controllable source of fluid under pressure which when activated causes the fluid to enter into sleeve 56 through opening 58 and flow downwardly therethrough past impervious upper portion for egress into the soil through perforations 70 and opening 60. The coaction of sleeve 56, openings 58, 60 and perforations 70 is herein characterized as discharge arrangement 20 for ease of explanation. The arrangement in the installation mode is shown in FIG. 2.

As can be readily understood from the above description and from the drawing, an underground irrigation apparatus is herein described and illustrated which fulfills all of the aforestated objectives in a remarkably unexpected fashion and which can be used in a simple and efficient manner. It will be appreciated that although the apparatus is disclosed as comprising the two aforementioned means or parts, a ground penetrating means can be employed with a plurality of distribution means strategically disposed over a larger area whereby the installation cost of my apparatus and systems is still further reduced. In addition, even though the apparatus is primarily intended for use with an irrigation medium, such as water, it is apparent that it can also be used with other suitable fluids or gases under pressure to provide useful fluidizing for whatever purpose may be appropriate. It is further understood that such modifications, alterations and adaptations of the structure, arrangements, proportions, elements, materials and components of the invention as may readily occur to one skilled in the art when confronted with this disclosure are intended within the spirit of the present invention which is limited only by the scope of the claims appended hereto.

Accordingly, what is claimed is:

1. Underground irrigation apparatus comprising in combination: ground penetrating means having a first end, a second end, and an elongated tubular body portion extending therebetween, said body portion having a central passageway defined therethrough having an ingress therein adjacent said first end and an egress therefrom adjacent said second end, hose coupling means operatively associated with said ingress in communicative relationship with said passageway and said egress to provide a fluid assist to said means when penetrating ground, said ground penetrating means adapted to form a hole in ground for which irrigation is desired; and distribution means having an elongated hollow body member having a first end and a second end and extending therebetween, said body member having a first and second opening disposed one at each end thereof, said body member having an upper impervious portion and a lower foraminous portion, said impervious portion being adapted to deliver fluid without loss from said first opening to said foraminous portion, said foraminous portion being adapted to deliver said fluid from said impervious portion in lateral and axial directions for delivery into the ground surrounding said body member.

2. Apparatus according to claim 1, in which said elongated hollow body member of said distribution means selectively receives said ground penetrating means therewithin to prevent blockage of said foraminous portion with externally generated matter during the insertion of said distribution means into the hole previously formed by said ground penetrating means.

3. Apparatus according to claim 1, in which said body portion of said ground penetrating means includes handle means affixed to said one of said ends to facilitate insertion of the other of said ends into ground to be irrigated.

4. Apparatus according to claim 3, in which said handle means have flow means defined therein in communication with said ingress of said central passageway to furnish fluid under pressure to said central passageway and out said egress to assist in inserting said elongated body portion into ground to be irrigated.

5. Apparatus according to claim 4, in which said handle means comprises a longitudinally extending member having a longitudinal axis and an elongated element having an extent, said longitudinally extending member being affixed symmetrically to said elongated element and disposed therewith so that the longitudinal axis of said longitudinally extending member is substantially perpendicular to the extent of said elongated element.

6. Apparatus according to claim 5, in which said longitudinally extending member of said handle means has a pair of similar, oppositely directed arms, each terminating in an end portion, said flow means comprises a bore formed in a one of said arms, commencing in said end portion and terminating substantially midway of said longitudinal extending element in a bend disposed in communicating relationship to said central passageway in said elongated element, said end portion of said bore having hose fitting means operatively attached thereto for placing said bore in operative communication with a source of fluid under pressure.

7. Apparatus according to claim 6, in which hand grip means is associated with each of said arms of the longitudinally extending member to facilitate the manipulation of said elongated element.

8. Apparatus according to claim 6, in which said distribution means forms a manifold, having a hose coupling attached to said first opening at said end of said body member, the other of said ends of said elongated hollow body member being tapered to facilitate insertion of said sleeve into ground to be irrigated.

9. Apparatus according to claim 8, in which said hollow body member is substantially coextensive with and has a cross section sufficient to receive said elongated element of said ground penetrating means therewithin, said hollow body member being perforated for discharging fluid therefrom into the ground circumscribed thereabout and therebeneath.

10. Apparatus according to claim 9, in which said distribution means includes means for selectively receiving said ground penetrating means in telescopic relationship therewithin to prevent blockage of said discharge means during insertion of said distribution means into a hole formed by said ground penetrating means.

11. Apparatus according to claim 9, in which one of said grip means is associated with each of said arms of said longitudinally extending member to facilitate manipulation of said elongated element within said hollow body member.

12. Apparatus according to claim 1, in which said distribution means forms a manifold having hose coupling attached to said first opening at said end of said body member, the other of said ends of said hollow body member being tapered to facilitate insertion of said body member into ground to be irrigated.

13. Apparatus according to claim 12, in which said hollow body member is substantially coextensive with and has a cross section sufficient to receive said ground penetrating means therewithin, said hollow body member being perforated for discharging fluid therefrom into the ground circumscribed thereabout and therebeneath.

14. A method for installing an underground irrigation apparatus into ground to be irrigated, comprising the steps of:
(a) inserting a ground penetrating device into ground to be irrigated;
(b) removing said ground penetrating device from said ground to be irrigated, leaving a formed hole in the ground;
(c) inserting a distribution device into said formed hole;
(d) connecting a flowing source of fluid to said distribution device to fill said distribution device and irrigate the ground adjacent thereto.

15. A method according to claim 14, in which the step of inserting said distribution device includes the steps of inserting said ground penetrating device telescopically into said distribution device, lowering the distribution device with said penetrating device therewithin into said formed hole so as to prevent clogging of a discharge opening of said distribution device, and thereafter removing said ground penetrating device from within said distribution device and leaving said distribution device in place in the ground to be irrigated.

16. A method according to claim 15, in which the step of lowering said distribution device into said formed hole with the ground penetrating device in place therewithin includes the step of reciprocating said ground penetrating device within said distribution device to dislodge dirt from the discharge opening of the distribution device.

* * * * *